UNITED STATES PATENT OFFICE.

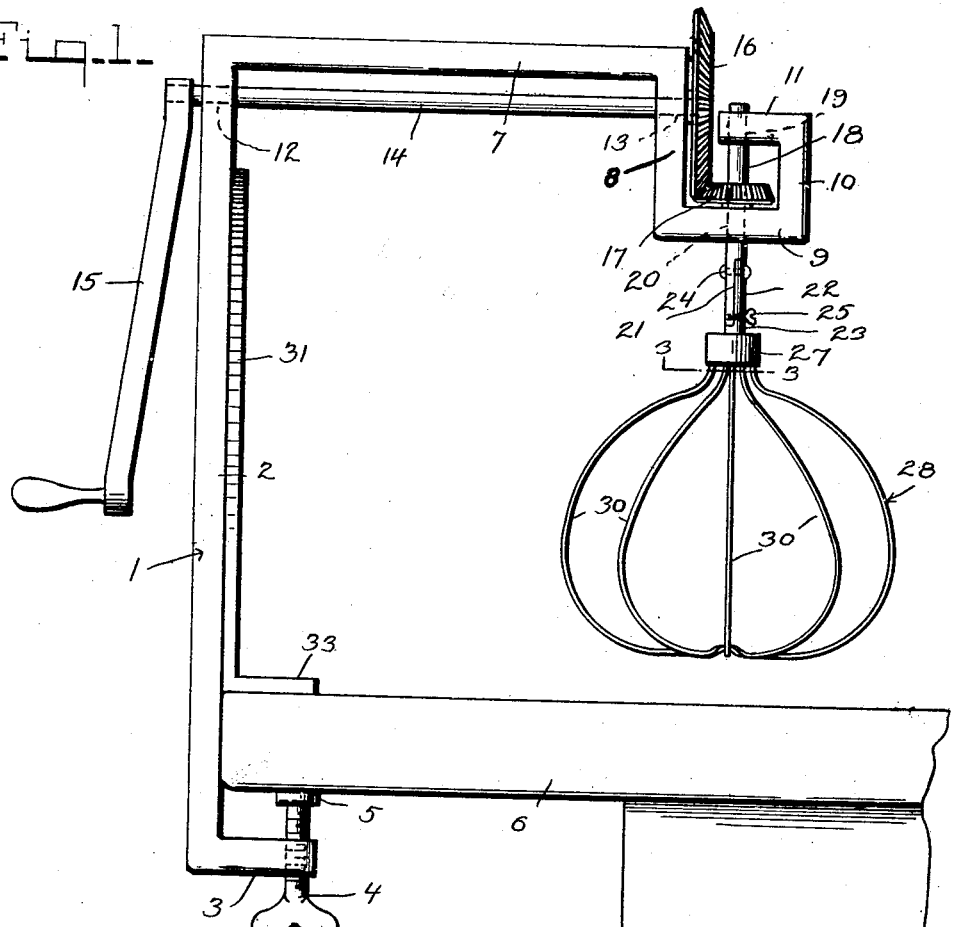

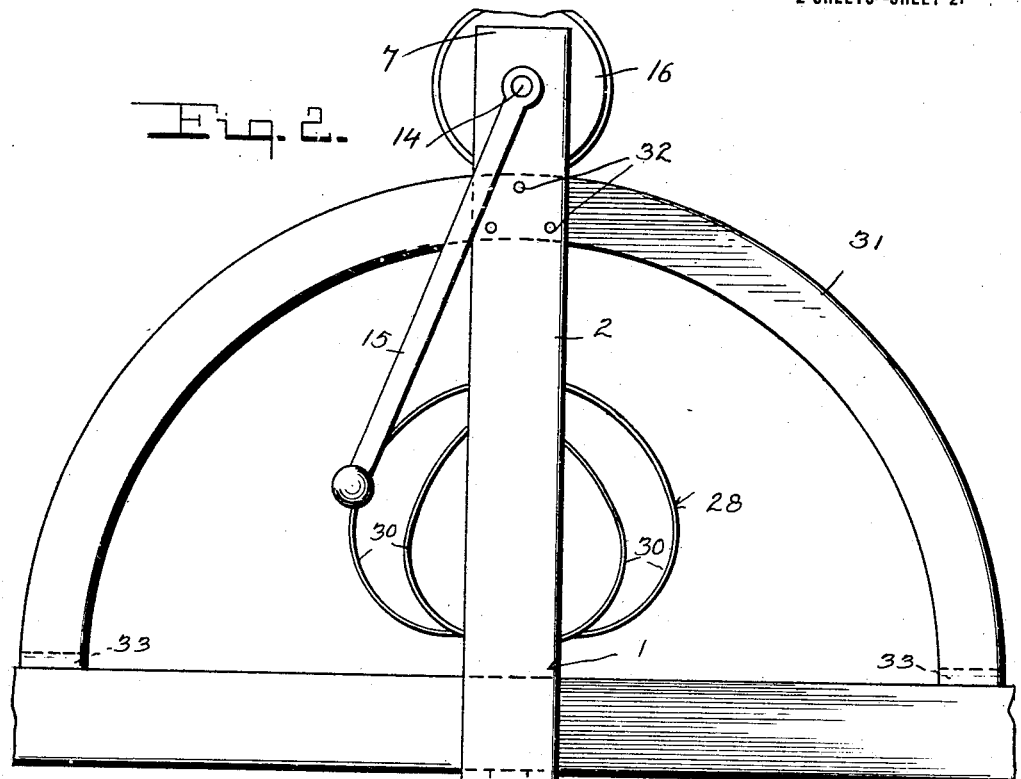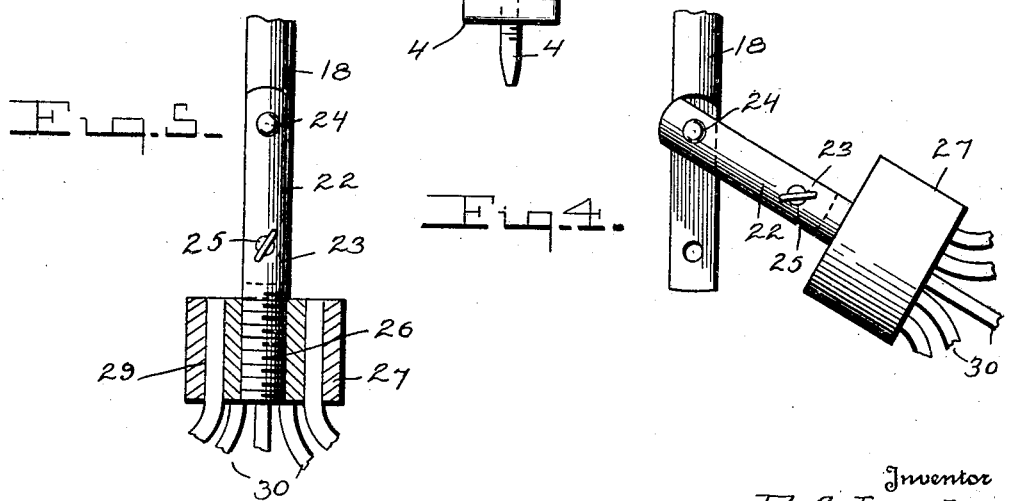

ERNEST A. JOINETTE, OF EDMONTON, ALBERTA, CANADA.

OPERATING DEVICE FOR BEATERS.

1,246,103.     Specification of Letters Patent.     Patented Nov. 13, 1917.

Application filed May 28, 1915.   Serial No. 31,049.

*To all whom it may concern:*

Be it known that I, ERNEST A. JOINETTE, a citizen of the United States, residing at Edmonton, in the Province of Alberta and Dominion of Canada, have invented certain new and useful Improvements in Operating Devices for Beaters; and I do hereby declare the following to be a full, clear, and exact description of the invention, such as will enable others skilled in the art to which it appertains to make and use the same.

This invention relates to devices for beating eggs, whipping cream, or stirring or mixing various types of ingredients of food stuffs, and the primary object of this invention is to provide a device of this nature, which is comparatively simple in construction, and easy to manipulate, and further to provide a novel form of supporting structure, which includes means for securely clamping the mixer or beater to the edge of a table, bench or analogous permanent support.

Another object of this invention is to provide a beater head which is pivotally and detachably connected to the operating shaft of the same, so that it may be moved to one side, of the power shaft for facilitating its insertion into the receptacle containing the food ingredients to be treated.

With the foregoing and other objects in view this invention consists in such novel features of construction, combination and arrangement of parts as will be hereinafter more fully described, illustrated in the accompanying drawings and claimed.

In describing the invention in detail, reference will be had to the accompanying drawings wherein like characters designate like or corresponding parts throughout the several views, and in which:—

Figure 1 is a side elevation of the improved egg beater or cream whipper,

Fig. 2 is an edge view of the device,

Fig. 3 is a cross section on the line 3—3 of Fig. 1,

Fig. 4 is a fragmentary view of the beater, showing the pivotal connection between the beater head and the power shaft, and Fig. 5 is a sectional view through the beater head.

Referring more particularly to the drawings, 1 designates the supporting bracket of the egg beater as an entirety, which includes a substantially vertical section 2, the lower end 3 of which is bent at right angles thereto. The lower end 3 of the vertical section 2 of the bracket 1, has a thumb screw 4 adjustably carried thereby which has a swiveled head 5 mounted upon its upper end, for engagement with the under surface of the edge of a table or bench top, as is indicated at 6 in Fig. 1 of the drawings. The upper end of the vertical section 2 of the bracket 1 has a substantially horizontally positioned section 7 formed thereupon and extending forwardly therefrom substantially parallel with the angled end 3. The outer end of the section 7 extends downwardly, forming a vertical section 8, which has a horizontal section 9 connected to its lower end. A vertical section 10 is formed upon the end of the horizontal section 9, opposite to the one which is connected to the vertical section 8. The sections 8 and 10 are parallel, and parallel with the vertical section 2. A horizontal section 11 is connected to the upper end of the vertical section 10, and is spaced above and parallel with the vertical section 9, as is clearly shown in Fig. 1 of the drawings.

The vertical sections 2 and 8 are provided with openings 12 and 13 formed therein respectively, in which openings is rotatably seated a shaft 14. The shaft 14 has a crank handle 15 mounted upon its outer end, for facilitating the manual rotation of the shaft. A beveled gear 16 is mounted on the inner end of the shaft 14, and is spaced between the free end of the horizontal section 11 and the side of the vertical section 8, which faces the end of the section 11. The beveled gear 16 meshes with a beveled pinion 17, which is mounted upon a vertical shaft 18. The vertical shaft 18 is rotatably mounted in bearings 19 and 20, which are formed in the horizontal sections 11 and 9 respectively.

The vertical shaft 18 has substantially one-half of its lower end cut away, as is shown at 21. The remaining half of the lower cut away end of the shaft 18 has the upper end 22 of a stub shaft 23 pivotally connected thereto, as is shown at 24. The upper end 22 forms substantially one-half of the sides of the shaft and has its inner straight side abutting the straight side of the reduced or cut away section 21 of the shaft 18. The shaft 23 has a thumb screw 25 carried thereby which is provided for insertion or connection with the reduced end 21 of the shaft 18, for holding the shaft 23 against pivotal movement with respect to the shaft 18.

The stub shaft 23 has its lower end externally screw threaded, as is shown at 26, which externally screw threaded end is removably seated in the collar 27, formed upon the upper end of the beater head 28. The collar 27 is provided with a plurality of vertical openings 29 formed therein, in which openings are seated the ends of a plurality of beating wires 30. The wires 30 are connected in any suitable manner, with the collar 27, so as to prevent accidental displacement with respect thereto. The wires 30 are bowed outwardly, as is clearly shown in the drawings, for providing an efficient beating head.

The vertical section 2 of the supporting bracket 1 has an arcuate metallic strap 31 secured thereto, as is shown at 32. The arcuate strap 31 extends upon the opposite sides of the vertical section 2 and it has its lower end bent at right angles thereto, forming shoes 33, which are provided for resting upon the upper surface of the table or bench top 6, for coaction with the thumb screw 4 for securely clamping the beater or whipper to the table, bench or like support.

The beater head is rotated by the rotation of the shaft 14, through the medium of the beveled gear 16 and the beveled pinion 17, which will rotate the shaft 18 and the stub shaft 23, and consequently the collar 27 and the wires 30, for efficiently beating, whipping or mixing various types of food ingredients.

From the foregoing description, taken in connection with the accompanying drawings, it will be seen that a beater or mixer, has been provided, which will greatly facilitate the work of bakers, cooks, or confection makers, in making or mixing the various types of food ingredients, which must necessarily be beat, whipped or efficiently mixed, before being in proper condition for use, and while the foregoing description and the drawings set forth the preferred embodiment of this invention, it is to be understood that certain minor features of construction, combination and arrangement of parts may be altered to suit practical conditions, provided such alterations are comprehended within the scope of what is claimed.

What is claimed is:—

An egg beater comprising a vertical standard, the lower end of said standard being bent angularly to provide an arm, a clamping screw extending vertically through said arm, a horizontal arm formed integrally with the upper end of the standard, a vertical arm formed on the extreme end of the horizontal arm, said last named vertical arm being parallel with the vertical standard, a shaft journaled in one end of said vertical arm, the opposite end of the shaft being journaled in the vertical standard, a horizontal arm and a vertical arm formed integrally with the lower end of the last named vertical arm, a shaft journaled therein, a gear on said shaft, a gear carried on the end of the shaft in the first named vertical arm, said last named shaft adapted to have an egg beating element removably secured thereto, and an arcuate strap secured by its medial portion to the front face of the standard adjacent the upper end thereof and located on opposite sides of the standard, the ends of the straps being bent angularly adapted to engage the upper surface of the support to support the device in position in coöperation with the clamping screw.

In testimony whereof I affix my signature in presence of two witnesses.

ERNEST A. JOINETTE.

Witnesses:
J. E. JOINETTE,
C. J. BROCHU.

Copies of this patent may be obtained for five cents each, by addressing the "Commissioner of Patents Washington, D. C."